July 6, 1965  R. J. RUFF  3,193,263
CATALYTIC RADIANT HEAT TREATING APPARATUS
Original Filed March 9, 1959
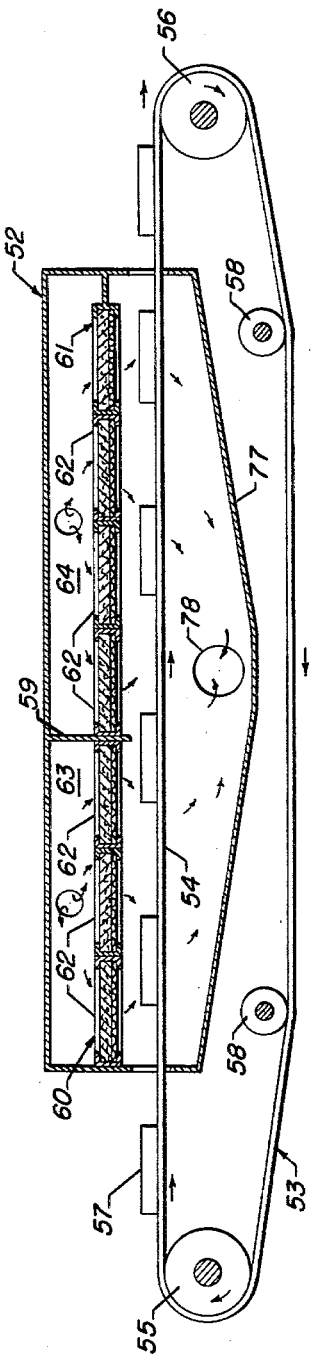
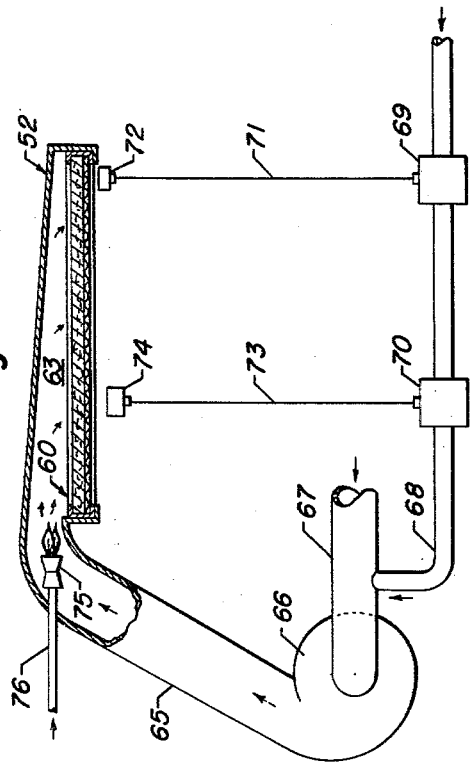
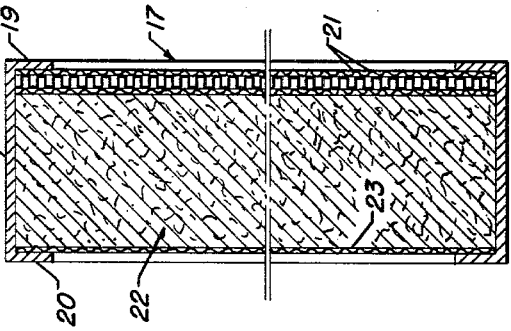
INVENTOR:
Richard J. Ruff
BY:
Chester J. Giuliani
Philip T. Liggett
ATTORNEYS United States Patent Office 3,193,263
Patented July 6, 1965

3,193,263
CATALYTIC RADIANT HEAT TREATING
APPARATUS
Richard J. Ruff, Detroit, Mich., assignor to Universal Oil
Products Company, Des Plaines, Ill., a corporation of
Delaware
Original application Mar. 9, 1959, Ser. No. 797,935.
Divided and this application Sept. 19, 1961, Ser.
No. 139,227
8 Claims. (Cl. 263—8)

This application is a division of my present application Serial No. 797,935, filed March 9, 1959, now abandoned.

The present invention relates to the heat treating of articles or materials and, more particularly to an improved type of heat treating apparatus utilizing a catalytic element as a source of radiant heat.

Heretofore, space heating as well as the heat treatment of articles and materials has been accomplished by the use of radiant heat and in most cases, the source of such radiant heat has been electrically energized infra-red lamps or calrod type heaters or in some instances gas fired burners in which the heat developed by combustion of the gas fuel is converted to radiant heat.

In the use of infra-red lamps as a source of radiant energy, it has been common practice to utilize a large number of such lamps together with suitable reflectors grouped closely together along the walls of an oven through which the work passes and the same type of apparatus is commonly utilized with calrod heaters which also utilize reflectors to direct the radiant heat in a desired pattern. Electrically energized radiant heat sources are relatively convenient to use and are quite effective on certain types of work but there are several disadvantages to this type of heater in that the surface of the heater itself must be at relatively high temperature in order to produce the desired radiant energy and, furthermore, the reflectors must be so designed and the work must be so positioned as to eliminate the possibility of producing hot spots on the work. Furthermore, the wave length of the infra-red energy is determined by the source temperature and since a relatively high source temperature is utilized in order to produce a relatively large quantity of infrared energy in a reasonably small space, it is sometimes difficult to provide the optimum wave length for the particular work being treated. Furthermore, high surface temperatures for the heat sources result in reduced heater life and in the event a single heating unit fails, the quality of the work is adversely affected.

Electrically energized heaters are not readily adaptable to proportional control since such heaters are either on or off, and where it is desired to secure an intermediate range of radiant energy, the control of electrically energized heaters is extremely difficult. Furthermore, reflectors utilized with electrically energized heaters gradually become covered with dirt deposits thereby reducing the efficiency of the reflectors, and since less energy is reflected, more energy is absorbed with a consequent increase in heat losses, and furthermore, the heat treatment of the work passing through the oven is adversely affected by changes in heating conditions caused by dirty reflectors and, even under the best conditions, a substantial portion of the heat released by an electrically energized heating element is transmitted through the reflector and absorbed in the insulation or in the room containing the oven. A further disadvantage of the electrically energized type of heater for use in radiant heating is the fact that electricity usually costs from three to seven times the cost of other fuels. As a result, it will be seen that other forms of radiant heat sources would be desirable for many applications.

Where gas is utilized as a fuel for radiant heating apparatus, it has been common practice to burn such gas in such a way that the flames impinges upon a ceramic which is capable of withstanding exceedingly high temperature and such ceramic may be of the cup type or line type where the source of high temperature consequently takes the appearance of either a circle or a line. The source temperature of such radiant energy is extremely high, and with proper adjustment of the air and gas mixture to the burner, there is no visible evidence of a flame, the only apparent heat source being a white hot ceramic. Since, with this type of radiant source, the source temperature must be exceedingly high, there is no possibility of controlling the actual wave length of the radiant energy reaching the work.

Where gas fired radiant heat burners are utilized, it is necessary to position the work being treated at a relatively great distance from the burner in order to provide a desired degree of heat distribution and to avoid excess heating or hot spots, and, furthermore, furnaces utilizing gas fired radiant heat burners are of necessity relatively large and heavy and consequently quite costly to manufacture and install.

Gas fired radiant heat burners may be proportionately controlled so that high or low or any intermediate energy release is possible, but in order to accomplish this result, the source of radiant heat remains at substantially the same temperature and only the size of the source increases or decreases. This results in non-uniform diffusion of the radiant energy where the energy released is varied and, consequently, some difficulty may be experienced in properly treating the work subjected thereto.

Radiant heat apparatus may also be used for certain types of cooking, such as boiling, and also this type of energy may be utilized for space heating purposes, and the apparatus of the instant invention may be adapted for any of the above-mentioned uses.

It is accordingly an object of the invention to provide a radiant heating apparatus in which a catalytic element is utilized as the source of the radiant heat.

A further object of the invention is the provision of a radiant heating apparatus in which a catalytic element is utilized as a source of radiant heat and in which there is no visible flame and in which substantially the entire radiant heat output is directed to a desired location or area without the use of reflectors.

A still further object of the invention is the provision of a radiant heating apparatus in which a catalytic element is utilized as a source of radiant heat and in which means is provided for preheating the catalytic element to ignition temperature and in which means is provided for supplying a mixture of fuel and air to the catalytic element.

Another object of the invention is the provision of a radiant heating apparatus in which a catalytic element is utilized as a source of radiant heat, there being means provided for preheating the catalytic element to ignition temperature and for supplying a mixture of fuel and air to the catalytic element, there being also provided means for preventing the supply of fuel and air when the catalytic element is below ignition temperature, and further control means being provided for controlling the quantity of fuel and air mixture to vary the operating temperature of the catalytic element.

A still further object of the invention is the provision of a radiant heating apparatus in which catalytic elements are utilized as a source of radiant heat and in which such elements are disposed in separate zones through which the work may travel in order to subject such work to different heating conditions.

Further objects and advantages of the invention will be apparent from the following description taken in conjunction with the accompanying drawing wherein:

FIGURE 1 is a sectional view to an enlarged scale showing the structure of one of the catalytic metallic radiant heat source, walls or panels;

FIGURE 2 is a sectional view showing an invention in an embodiment in which a conveyor is utilized to transport articles to be heat treated through two different heat treating zones;

FIGURE 3 is an elevational view with parts in section for greater clarity and showing the manner of supplying a gas and air mixture to the catalytic metallic element heat source as well as the means for preheating the catalytic element to the ignition temperature and means for controlling the supply of fuel and air thereto.

With reference to FIGURE 1, the inner wall 17 may comprise a generally rectangular shell 18 having marginal inwardly extending flanges 19 and 20 and positioned within the flange 19 and forming the inner face of the wall 17 is an air pervious catalytic element 21. The structure of the catalytic element 21 may be in accordance with that shown and described in Patent No. 2,658,742 issued November 10, 1953, to H. R. Suter et al., and reference is made to this patent for a complete showing and description of the catalytic element 21 and in view of this reference, it is not considered necessary to specifically describe the structure of this element herein.

Referring now to FIGURES 2 and 3, there is provided an elongated horizontal chamber 52 having a conveyor 53 extending therethrough for supporting and transporting articles to be heat treated. The conveyor 53 may be of any suitable type but for convenience of illustration, there is shown a conveyor formed by an endless belt 54 trained around pulleys 55 and 56 and in which the upper run of the belt 54 passes through the chamber 52 and serves to support and transport articles 57 to be heat treated in the chamber 52. The lower run of the belt 54 may be guided by suitable pulleys or rollers 58.

A partition 59 is provided in the chamber 52 above the conveyor belt 54 and the partition 59 serves to separate the chamber 52 into different heat treating zones. While for convenience of illustration two heat treating zones are shown, nevertheless it is to be understood that any desired number of partitions may be provided in the chamber 52 to separate the same into any desired number of heat treating zones.

A horizontal radiant heating unit 60 is provided in zone 1 of the chamber 52 while a similar radiant heating unit 61 is provided in zone 2 of the chamber 52. The radiant heating units 60 and 61 are identical except for size and each unit comprises a plurality of panels 62, each panel being formed in the same manner as described above and shown in detail in FIGURE 1, the lower wall or surface being provided by a catalytic element above which there is disposed a layer of wool-like material, and such layer being held in place by a backing screen, all as described above in connection with FIGURE 1. Any number of panels 62 may be provided in the heating zones to supply the required heat output over the necessary surface area.

A closed compartment 63 is provided within the chamber 52 above the radiant heating unit 60 in zone 1, and in a similar manner, a closed compartment 64 is provided within the chamber 52 above the radiant heating unit 61 in zone 2. As best shown in FIGURE 3, a conduit 65 communicates with the compartment 63 and the opposite end of the conduit 65 is connected to the output of a blower 66 or other suitable source of air pressure. An air inlet conduit 67 is provided for the blower 66 and connected to the inlet conduit 67 is a fuel supply conduit 68 provided with an automatically operable temperature controlled shut-off valve 69 and also an automatically operable temperature controlled proportional valve 70. Shut-off valve 69 may be connected through a suitable conductor 71 with a temperature responsive element 72 positioned adjacent the catalytic element in the radiant heating unit 60 and the proportional control valve 70 is connected through a suitable conductor 73 to a temperature responsive element 74 positioned in zone 1 of the chamber 52 and in proximity to the article 57 passing through the chamber. A preheating burner 75 provided with fuel through a conduit 76 may be positioned in the conduit 65 in a suitable manner to supply heat to the radiant heating unit 60 in order to heat the catalytic element to ignition temperature. A hood 77 may be provided below the upper run of the conveyor belt 54 in order to collect the products of combustion and the hood 77 may be connected through an aperture 78 with a suitable exhaust conduit.

In the operation of the above described form of the invention, it is assumed that articles 57 to be heat treated are positioned on the conveyor belt 54 and transported through the chamber 52 below the radiant heating units 60 and 61. The preheating burner 75 is placed in operation and the catalytic element in the heating unit 60 and also the catalytic element in the heating unit 61 are raised to ignition temperature and upon reaching such temperature, the temperature responsive element 72 operates to open the shut-off valve 69 which results in supplying fuel to the air intake conduit 67 of the blower 66 and the mixture of fuel and air is supplied through the conduit 65 to the compartment 63 above the heating unit 60, whereupon this fuel and air mixture is burned by catalytic action of the catalytic element forming the lower wall or surface of the heating element 60. The temperature within the heat treating chamber is controlled by the temperature responsive element 74 located therein which operates to control the proportional valve 70 thereby controlling the fuel supply to the catalytic elements forming the heating units 60 and 61. It is, of course, understood that a fuel and air supply conduit similar to that described above is connected to the chamber or compartment 64 above the heating unit 61 in zone 2, and that the operation of the heating unit 61 is controlled in the same manner as described above in connection with the operation of heating unit 60.

It will therefore be seen that the entire heat output of the radiant heating units 60 and 61 is directed downwardly to the articles 57 passing through the chamber 52 and consequently such articles will be subjected to uniformly distributed radiant heat supplied by the radiant heating units 60 and 61, which operate to provide for uniform heat treatment of the articles 57 without the presence of hot spots and also with complete control of the heating conditions.

While the various heating units utilizing catalytic elements have been described as being generally rectangular and flat, it is of course understood that these units may be made in other shapes and also may be curved or formed in various configurations to correspond with the configuration of the material or articles being heat treated. Also for convenience, the above description has dealt with the heat treatment of articles but obviously the same principles of construction may be utilized to provide radiant heat sources for cooking purposes and also for space heating.

It will be obvious to those skilled in the art that various changes may be made in the invention without departing from the spirit and scope thereof, and therefore the invention is not limited by that which is shown in the drawings and described in the specification.

I claim as my invention:

1. A catalytic radiant heat treating apparatus comprising an elongated horizontal chamber, means in said chamber for supporting articles to be heat treated, a substantially horizontal flameless and catalytic radiant heating unit spaced above and disposed in heat radiating relation to said supporting means, said unit including a lower wall formed by an air pervious catalytic element providing a source of radiant heat and a layer of air diffusing material covering the upper surface of said catalytic element, a closed compartment above said unit and communicating with said catalytic element through said layer, a conduit communicating with said compartment, means for supplying air under pressure to said conduit, means for preheating the catalytic element to ignition temperature, and a fuel supply connected to said conduit, whereby articles on said supporting means will be heat treated by radiant heat emanating from said flameless catalytic element.

2. A catalytic radiant heat treating apparatus comprising an elongated horizontal chamber, means in said chamber for supporting articles to be heat treated, a substantially horizontal flameless and catalytic radiant heating unit spaced above and disposed in heat radiating relation to said supporting means, said unit including a lower wall formed by an air pervious catalytic element providing a source of radiant heat and a layer of air diffusing material covering the upper surface of said catalytic element, a closed compartment above said unit and communicating with said catalytic element through said layer, a conduit communicating with said compartment, means for supplying air under pressure to said conduit, means for preheating the catalytic element to ignition temperature, a fuel supply connected to said conduit, an automatically operable shut-off valve in the fuel supply to said conduit, temperature responsive elements adjacent the catalytic element and operable to open said shut-off valve upon said catalytic element reaching ignition temperature and to close said shut-off valve upon the temperature of the catalytic element falling below ignition temperature, an automatically operable control valve in the fuel supply to said conduit and temperature responsive elements adjacent said supporting means for controlling the operation of said control valve to control the supply of fuel to the catalytic element in accordance with the temperature, whereby articles on said supporting means will be heat treated by radiant heat emanating from said flameless catalytic element.

3. A catalytic radiant heat treating apparatus comprising an elongated horizontal chamber, a conveyor extending through said chamber for supporting and transporting articles to be heat treated, a horizontal flameless and catalytic radiant heating unit spaced above and disposed in heat radiating relation to said conveyor, said unit including a lower wall formed by an air pervious catalytic element providing a source of radiant heat and a layer of air diffusing material covering the upper surface of said catalytic element, a closed compartment above said unit and communicating with said catalytic element through said layer, a conduit communicating with said compartment, means for supplying air under pressure to said conduit, means for preheating the catalytic element to ignition temperature, a fuel supply connected to said conduit, an automatically operable shut-off valve in the fuel supply to said conduit, temperature responsive elements adjacent the catalytic element and operable to open said shut-off valve upon said catalytic element reaching ignition temperature and to close said shut-off valve upon the temperature of said catalytic element falling below ignition temperature, an automatically operable control valve in the fuel supply to said conduit and temperature responsive elements adjacent said conveyor for controlling the operation of said control valve to control the supply of fuel to the catalytic element in accordance with the temperature, whereby articles carried by said conveyor will be heat treated by radiant heat emanating from said flameless catalytic element.

4. A catalytic radiant heat treating apparatus comprising an elongated horizontal chamber, a conveyor extending through said chamber for supporting and transporting articles to be heat treated, a horizontal flameless and catalytic radiant heating unit spaced above and disposed in heat radiating relation to said conveyor, said unit including a lower wall formed by an air pervious catalytic element providing a source of radiant heat and a layer of air diffusing material covering the upper surface of said catalytic element, a closed compartment above said unit and communicating with said catalytic element through said layer, a conduit communicating with said compartment, means for supplying air under pressure to said conduit, a preheating burner disposed in said conduit for preheating the catalytic element to ignition temperature, a fuel supply connected to said conduit, an automatically operable shut-off valve in the fuel supply to said conduit, temperature responsive elements adjacent the catalytic element and operable to open said shut-off valve upon said catalytic element reaching ignition temperature and to close said shut-off valve upon the temperature of the catalytic element falling below ignition temperature, an automatically operable control valve in the fuel supply to said conduit and temperature responsive elements adjacent said conveyor for controlling the operation of said control valve to control the supply of fuel to the catalytic element in accordance with the temperature, whereby articles carried by said conveyor will be heat treated by radiant heat emanating from said flameless catalytic element.

5. A catalytic radiant heat treating apparatus comprising an elongated horizontal chamber, a conveyor extending through said chamber for supporting and transporting articles to be heat treated, a horizontal flameless and catalytic radiant heating unit disposed above and disposed in heat radiating relation to said conveyor, said unit comprising a plurality of panels, each panel including a lower wall formed by an air pervious catalytic element providing a source of radiant heat and a layer of air diffusing material covering the upper surface of said catalytic element, a closed compartment above said panels and communicating with said catalytic elements through said layers, a conduit communicating with said compartment, means for supplying air under pressure to said conduit, a preheating burner disposed in said conduit for preheating the catalytic elements to ignition temperature, a fuel supply connected to said conduit, an automatically operable shut-off valve in the fuel supply to said conduit, temperature responsive elements adjacent the catalytic elements and operable to open said shut-off valves upon said catalytic elements reaching ignition temperature and to close said shut-off valves upon the temperature of the catalytic elements falling below ignition temperature, an automatically operable control valve in the fuel supply to said conduit and temperature responsive elements adjacent said conveyor for controlling the operation of said control valves to control the supply of fuel to the catalytic elements in accordance with the temperature, whereby articles carried by said conveyor will be heat treated by radiant heat emanating from said flameless catalytic elements.

6. A catalytic radiant heat treating apparatus comprising an elongated horizontal chamber, a conveyor extending through said chamber for supporting and transporting articles to be heat treated, a partition in said chamber above said conveyor providing first and second heat treating zones, a horizontal flameless and catalytic radiant heating unit in each zone spaced above and disposed in heat radiating relation to said conveyor, each unit comprising a plurality of panels, each panel including a lower wall formed by an air pervious catalytic element providing a source of radiant heat and a layer of air diffusing material covering the upper surface of said catalytic element, a closed compartment in each zone above said panels and communicating with said catalytic elements through said layers, a conduit communicating with said first compartment and a second conduit communicating with said second campartment, means for supplying air under pressure to each conduit, a preheating burner disposed in each conduit for preheating the catalytic elements in each zone to ignition temperature, a fuel supply connected to each conduit, an automatically operable shut-off valve in the fuel supply to each conduit, temperature responsive elements in each zone adjacent the catalytic elements and operable to open said shut-off valves upon said catalytic elements reaching ignition temperature and to close said shut-off valves upon the temperature of the catalytic elements falling below ignition temperature, an automatically operable control valve in the fuel supply to each conduit and temperature responsive elements in each zone for controlling the operation of said control valves to control the supply of fuel to the catalytic elements in accordance with the temperature in each zone, whereby articles carried by said conveyor will be heat treated by radiant heat emanating from said flameless catalytic elements.

7. A catalytic radiant heat treating apparatus comprising an elongated horizontal chamber, a conveyor extending through said chamber for supporting and transporting articles to be heat treated, a partition in said chamber above said conveyor providing first and second heat treating zones, a horizontal flameless and catalytic radiant heating unit in each zone spaced above and disposed in heat radiating relation to said conveyor, each unit comprising a plurality of panels, each panel including a lower wall formed by an air pervious catalytic element providing a source of radiant heat and a layer of air diffusing wool-like flameproof material covering the upper surface of said catalytic element, a closed compartment in each zone above said panels and communicating with said catalytic elements through said layers, a conduit communicating with said first compartment and a second conduit communicating with said second compartment, means for supplying air under pressure to each conduit, a preheating burner disposed in each conduit for preheating the catalytic elements in each zone to ignition temperature, a fuel supply connected to each conduit, an automatically operable shut-off valve in the fuel supply to each conduit, temperature responsive elements in each zone adjacent the catalytic elements and operable to open said shut off valves upon said catalytic elements reaching ignition temperature and to close said shut-off valves upon the temperature of the catalytic elements falling below ignition temperature, an automatically operable control valve in the fuel supply to each conduit and temperature responsive elements in each zone for controlling the operation of said control valves to control the supply of fuel to the catalytic elements in accordance with the temperature in each zone, whereby articles carried by said conveyor will be heat treated by radiant heat emanating from said flameless catalytic elements.

8. A catalytic radiant heat treating apparatus comprising an elongated horizontal chamber, a conveyor extending through said chamber for supporting and transporting articles to be heat treated, a partition in said chamber above said conveyor providing first and second heat treating zones, a horizontal flameless and catalytic radiant heating unit in each zone spaced above and disposed in heat radiating relation to said conveyor, each unit comprising a plurality of panels, each panel including a lower wall formed by an air pervious catalytic element providing a source of radiant heat, a layer of air diffusing wool-like flameproof material covering the upper surface of said catalytic element and a screen covering the upper surface of said layer to retain the same in place, a closed compartment in each zone above said panels and communicating with said catalytic elements through said screens and said layers, a conduit communicating with said first compartment and a second conduit communicating with said second compartment, means for supplying air under pressure to each conduit, a preheating burner disposed in each conduit for preheating the catalytic elements in each zone to ignition temperature, a fuel supply connected to each conduit, an automatically operable shut-off valve in the fuel supply to each conduit, temperature responsive elements in each zone adjacent the catalytic elements and operable to open said shut-off valves upon said catalytic elements reaching ignition temperature and to close said shut-off valves upon the temperaure of the catalytic elements falling below ignition temperature, an automatically operable control valve in the fuel supply to each conduit and temperature responsive elements in each zone for controlling the operation of said control valves to control the supply of fuel to the catalytic elements in accordance with the temperature in each zone, whereby articles carried by said flameless conveyor will be heat treated by radiant heat emanating from said catalytic elements.

References Cited by the Examiner

UNITED STATES PATENTS

| | | | |
|---|---|---|---|
| 1,213,470 | 1/17 | Finlay | 158—99 X |
| 1,469,178 | 9/23 | Ellis. | |
| 2,218,354 | 10/40 | Keller | 263—3 |
| 2,558,493 | 6/51 | Melot | 158—96 X |
| 2,658,742 | 11/53 | Suter et al. | 158—96 X |
| 2,668,701 | 2/54 | Dietrich | 263—3 |
| 3,022,987 | 3/59 | Thorsheim | 263—33 X |

FOREIGN PATENTS

| | | |
|---|---|---|
| 992,224 | 10/51 | France. |

CHARLES SUKALO, *Primary Examiner.*

PERCY L. PATRICK, *Examiner.*